US008898011B2

(12) United States Patent  
Peck et al.

(10) Patent No.: US 8,898,011 B2  
(45) Date of Patent: Nov. 25, 2014

(54) METHOD FOR MAINTAINING INTEGRITY AGAINST ERRONEOUS EPHEMERIS FOR A DIFFERENTIAL GPS BASED NAVIGATION SOLUTION SUPPORTING FAST SYSTEM STARTUP

(75) Inventors: Stephen R. Peck, West Hills, CA (US); Shuwu Wu, Yorba Linda, CA (US)

(73) Assignee: Raytheon Company, Waltham, MA (US)

(*) Notice: Subject to any disclaimer, the term of this patent is extended or adjusted under 35 U.S.C. 154(b) by 21 days.

(21) Appl. No.: 13/612,499

(22) Filed: Sep. 12, 2012

(65) Prior Publication Data

US 2014/0070988 A1 Mar. 13, 2014

(51) Int. Cl.  
*G01C 21/00* (2006.01)

(52) U.S. Cl.  
USPC ............. 701/469; 701/36; 701/408; 701/468; 342/357.24

(58) Field of Classification Search  
CPC ................................. G01S 19/20; G01S 19/08  
USPC .................. 701/36, 400, 408, 409, 468, 469; 342/357.24  
See application file for complete search history.

(56) References Cited

U.S. PATENT DOCUMENTS

| | | | | |
|---|---|---|---|---|
| 5,916,300 A * | 6/1999 | Kirk et al. | | 701/468 |
| 5,936,573 A * | 8/1999 | Smith | | 701/470 |
| 6,157,891 A * | 12/2000 | Lin | | 701/301 |
| 6,208,239 B1 * | 3/2001 | Muller et al. | | 340/426.35 |
| 6,281,836 B1 * | 8/2001 | Lupash et al. | | 342/357.58 |
| 6,480,789 B2 * | 11/2002 | Lin | | 701/301 |
| 6,675,095 B1 * | 1/2004 | Bird et al. | | 701/301 |
| 7,768,451 B2 | 8/2010 | Wu et al. | | |
| 8,019,539 B2 | 9/2011 | Vanderwerf | | |
| 8,570,217 B2 | 10/2013 | Oehler | | |
| 2003/0117317 A1 | 6/2003 | Vanderwerf | | |
| 2008/0084348 A1 | 4/2008 | Vacher | | |

FOREIGN PATENT DOCUMENTS

WO   WO 2004/031797   4/2004

OTHER PUBLICATIONS

PCT/US2013/050090; filed Jul. 11, 2013; Raytheon Company; international search report dated Sep. 26, 2013.

* cited by examiner

*Primary Examiner* — Gertrude Arthur-Jeanglaude  
(74) *Attorney, Agent, or Firm* — Thorpe North & Western LLP

(57) ABSTRACT

Technology for generating a H1 protection level from an N−1 position in a global positioning system (GPS) receiver is disclosed. One approach can include an H1 monitor configured to generate an H1 protection level from an N number of N−1 positions. The N−1 position can be derived by a differential global positioning system (GPS) satellite measurement removed from a plurality of N differential GPS satellites measurements.

20 Claims, 4 Drawing Sheets

METHOD FOR MAINTAINING INTEGRITY AGAINST ERRONEOUS EPHEMERIS FOR A DIFFERENTIAL GPS BASED NAVIGATION SOLUTION SUPPORTING FAST SYSTEM STARTUP

BACKGROUND

Satellite navigation systems, such as the global positioning system (GPS), enable a receiver to determine a location from ranging signals received from a plurality of satellites. The ranging signals can be broadcasted on frequencies, such as the L1 signal (1.57542 gigahertz [GHz]) and/or L2 signal (1.2276 GHz). L1 can have a wavelength of about 19 centimeters (cm) and L2 can have a wavelength of about 24 cm. Position can be determined from code and/or carrier phase information. A code division multiple access (CDMA) code is transmitted by the GPS satellites to the receiver and correlated with replica codes to determine ranges to different satellites. Accuracy can be enhanced using real-time kinematic (RTK) processing of carrier phase information. Accuracy at the level of tens of centimeters is possible with RTK carrier phase integer ambiguity resolution. RTK carrier phase integer ambiguity resolution can be used in applications with very accurate positional location information requirements and high integrity requirements.

High-accuracy relative positioning data with minimally acceptable integrity levels provided by RTK processing can be used in land surveying, precision agriculture, and/or construction applications. In other applications, such as those that present a substantial risk to human life, precision positioning with both high accuracy and high integrity is desirable. For example, applications that involve landing an aircraft, mid-air refueling, or coordinated formations flight can use a RTK positioning technique that is both highly accurate and also provides a high integrity level (e.g., high integrity protection level).

A high integrity protection level operates from the assumption that the GPS measurement data is without fault. In order to further increase the integrity of any real time kinetic positioning techniques, a positioning system may monitor the received data in order to minimize the effects of faulty measurements. Monitoring, however, may not remove the possibility of using faulty measurements to calculate GPS positions in some examples.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
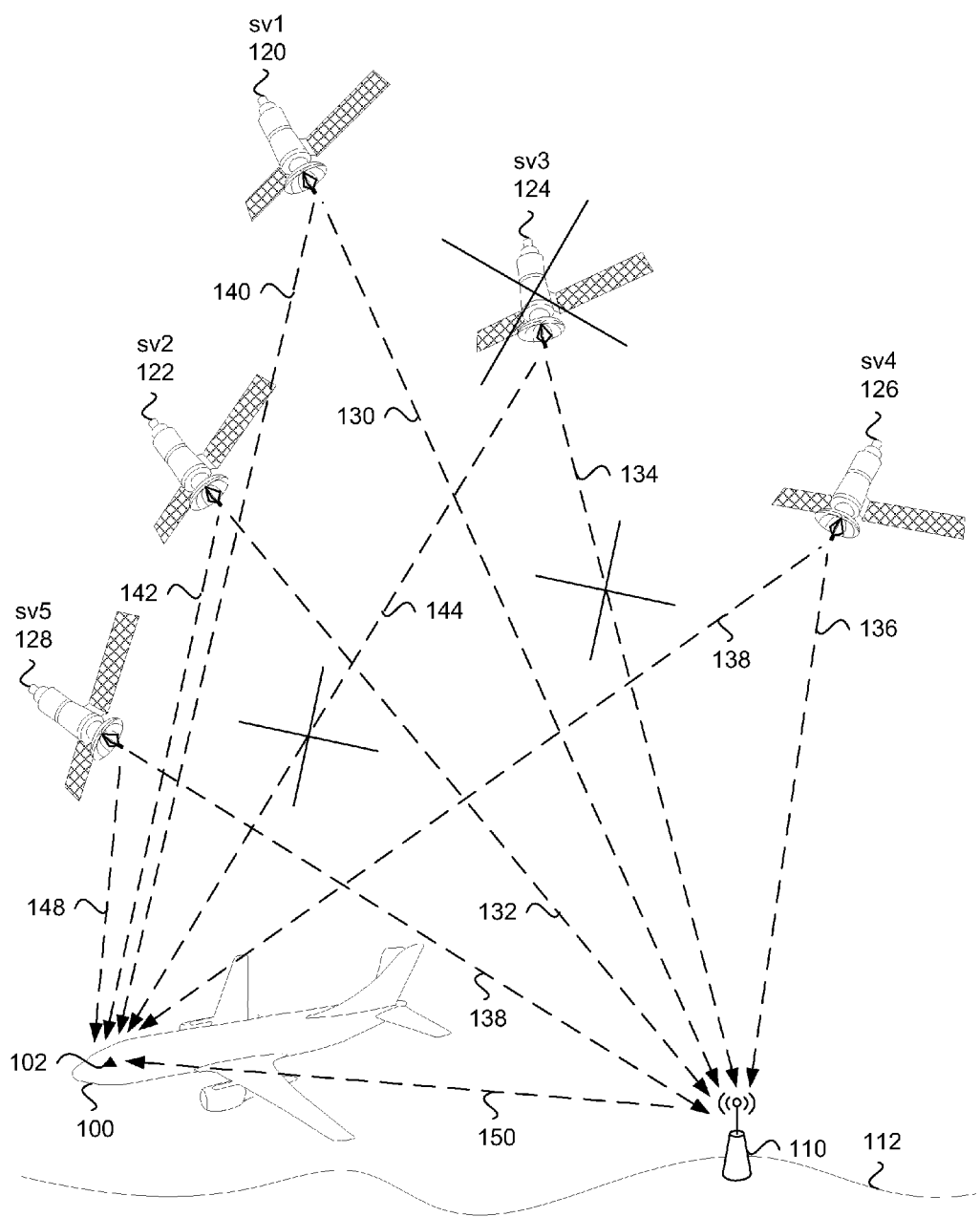
FIG. 1 illustrates a block diagram of a plurality of global positioning system (GPS) satellites and a plurality of GPS receivers in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Relative navigation systems using global positioning can have both high accuracy and high integrity. A relative navigation system can use at least two positioning receivers (e.g., GPS receivers) that move independently from each other or that can vary position relative to each other. A relative navigation system can have a reference platform or reference receiver (that may be moving) and remote user platforms or user receivers (that may also be moving) that may generate a relative position to the reference system with high accuracy and integrity. Integrity can be based on a small probability that a relative navigation error could exceed a calculated protection level (PL). In an example, a relative position can be based on at least 2 sets of synchronous GPS measurements from the reference receivers on the relative navigation system and at least one remote GPS sensor on the user platform. When the reference platform and/or user platform dynamics are sufficiently high, or the measurement latency due to processing and communications is sufficiently long, an inertial navigation system (INS) based on measurements from inertial measurement units (IMU) that can include gyrometers and accelerometers may be used to propagate the relative navigation solution between GPS measurements and/or to extrapolate the solution to current time to account for a system latency.

Positioning measurements can include ephemeris information of a GPS satellite included in a GPS signal transmitted by the GPS satellite. The GPS signal may also include ephemeris information of other GPS satellites in the system or GPS constellation. When the positioning measurements including ephemeris information are valid, an H0 protection level can be calculated. The H0 protection level represents a fault free protection level (e.g., fault-free hypothesis equation) or a protection level with no measurement errors or ephemeris faults. A fault or measurement error can be generated by an ephemeris fault (or ephemeris error). Ephemeris faults can be information based faults, e.g., faults in ephemeris data and/or clock messages. For example, in one aspect, ephemeris data that provides the satellite position may experience unusually large errors. Ephemeris faults can be monitored by high integrity systems, but may only be monitored at an observable threshold, which may be considerably larger than normal ephemeris errors. Thus, ephemeris faults may be larger than normal ephemeris errors that do not meet an observable threshold. Unobservable ephemeris faults can compromise integrity.

A monitor (e.g., ephemeris monitor) can be used to track the ephemeris of GPS satellites and ensure ephemeris integrity. Because conventional monitoring may not detect or remove faulty measurements used to calculate GPS positions until after a specified startup time (e.g., a couple of hours), a monitor can be designed to factor an ephemeris fault into the accuracy as well as the integrity protection level until the monitor can ensure ephemeris integrity. Such a monitor may be configured to generate both a H0 and H1 protection levels. An H1 protection level can be a protection level generated if a single hypothetical fault occurs with a positioning measurement from a single source, such as a single GPS ephemeris error. The H1 protection level can be generated from an N−1 (N minus one) position, where N represents the number of GPS satellite used for the positioning measurement (e.g., an N position). The N−1 position can be derived by removing measurements from a specified GPS satellite from a plurality of N GPS satellites measurements. The GPS measurements (including the removed GPS measurements) can be based on the GPS signals received from the GPS satellite. Each GPS satellite measurement can include ephemeris information for the GPS satellite transmitting the GPS signal as well as other GPS satellites in the GPS constellation.

With the H1 protection level generated from an N−1 position, high integrity differential GPS navigation systems can account for the possibility that the GPS satellite ephemeris data may be corrupted. Using the N−1 position, allows a monitor to support a quick start-up (e.g., within or around 30 minutes), when ephemeris history is not available for an autonomous system. Using the N−1 position can provide a protection level beyond just using a past history and current observations to monitor an ephemeris error and bound the maximum undetectable error. The H1 protection level generated from an N−1 position can be used to maintain acceptable performance and high integrity in the event of possible ephemeris errors, which H1 protection level can be used to support a rapid startup of a relative navigation system and/or GPS receiver used in a mobile system.

FIG. 1 illustrates a plurality of GPS receivers 102 and 110 in a relative navigation system receiving GPS signals from a plurality of GPS satellites 120-128. Each GPS satellite can be referred to as a space vehicle (e.g., sv). The signal from a GPS satellite can be used to generate a measurement to calculate a receiver's position. Each GPS signal can be used solve for an unknown in the three dimensional (3D) position of the receiver (e.g., GPS receiver). Since a 3D position can have three unknowns, three independent signals from three separate GPS satellites can be used to calculate a 3D position. Since the GPS satellite and the GPS receiver do not operate using a same clock, a fourth independent signal from a fourth GPS satellite can be used to compensate for clock bias in the GPS receiver. So, measurements from the independent GPS signals from four different GPS satellites can be used to calculate a precise GPS receiver position. Often more than four satellites may be in view of a GPS receiver, so the additional GPS signals can provide redundancy or additional error checking for the measurements used to calculate the GPS receiver position.

FIG. 1 illustrates a differential GPS system with a reference receiver 110 (e.g., reference GPS receiver) and a user receiver 102 (or remote receiver). The reference receiver and the user receiver (e.g., user GPS receiver) can each include multiple receivers, which can provide redundancy for error checking and/or fault protection. The reference receiver and the user receiver can each include a transceiver for communicating with each other. For example, the reference receiver can send signals 150, such as GPS measurements generated from GPS signals received by the reference receiver, to the user receiver. The reference receiver and the user receiver can be movable or fixed. For example, the reference receiver can be setup at a fixed position on the surface of the Earth 112, and the user receiver can be integrated into a mobile vehicle, such as an aircraft 100.

As shown in FIG. 1, five GPS satellites 120-128 can send signals 130-138 to the reference receiver and send signals 140-148 to the user receiver. The reference receiver can calculate a reference receiver position (or location) from measurements generated from the received GPS signals. The GPS signals received by the reference receiver, measurements generated from the received GPS signals, and/or the reference receiver position can be transmitted to the user receiver. The user receiver can calculate a user receiver position and/or relative user position to the reference receiver from measurements generated from the GPS signals received by the user receiver and reference receiver position information received from the reference receiver. In an example, the user receiver's relative position to the reference receiver can be more accurate than an absolute global position.

As illustrated in FIG. 1, an aircraft can generate a position and a protection level using measurements generated from the signals of the at least five GPS satellites 120-128. When all the signals of GPS satellite in view of the receiver are used, an H0 protection level can be generated. When the measurements generated from the signals 134 and 144 of one of the GPS satellite 124 is removed and the rest of the measurements are used, an H1 protection level can be generated. A H1 protection level can be generated for each GPS satellite removed. For example, a first position and a first H1 protection level (e.g., sv1 removed H1 protection level) can be generated from measurements derived from sv2 122, sv3 124, sv4 126, and sv5 128 with a sv1 120 removed from the set of measurements. A second position and a second H1 protection level (e.g., sv2 removed H1 protection level) can be generated from measurements derived from sv1 120, sv3 124, sv4 126, and sv5 128 with a sv2 122 removed from the set of measurements, and so forth calculating a H1 protection level for the measurements of each GPS satellite (sv3 124, sv4 126, and sv5) removed.

For example, an aircraft 100 can perform an H1 calculation for ephemeris when flying against a mobile system 110 that has just started up, and a conventional ephemeris monitor has not been able to validate ephemeris messages yet. The receiver of the aircraft and/or the mobile system can compute N−1 position by removing measurements from one GPS satellite. The receiver can compute a position bias between N−1 solution and an actual position. The receiver can compute H1 protection levels for N−1 position, taking into account a prior probability for a satellite ephemeris fault and a position bias. The receiver can compute an H0 protection level for an N position. The receiver can then select the larger of the H1 protection levels and the H0 protection level for a final protection level.

The following provides additional details of the examples. A differential navigation system can be fixed or mobile. Components of a fixed differential navigation system can be located on a ship, such as an aircraft carrier. Components of a mobile differential navigation system can be setup at a specified location, such as a newly acquired or temporary runway (e.g., landing strip). In an example, a mobile differential navigation system (e.g., land based differential navigation system) may have requirements to be deployed and operational within 90 minutes, which can include a hardware setup time. Differential system can maintain integrity even at an initial deployment, which can include a risk of faulted ephemeris messages from the GPS satellites. Conventional monitors can take hours to ensure ephemeris integrity after starting up "cold". Starting up "cold" can include a monitor that does not have prior measurements tracking ephemeris data or ephemeris integrity. Current approaches may not meet integrity and availability requirements within the 90 minute start-up.

Various approaches may be used to maintain integrity even at an initial deployment to meet a fast start-up requirement. First, an interpretation of an "operational after 90 minutes" requirement can be relaxed to allow system "availability" to be averaged over a longer time period, such as one day. Relaxing the interpretation of a requirement may not meet the definition of the "operational after 90 minutes" requirement since the system may provide minimal availability just after 90-minute setup, and "minimal availability does not equate operational." The first approach may not provide an adequate solution to an "operational after 90 minutes" requirement.

A second approach to maintain integrity at an initial deployment can be providing ephemeris data sets acquired from outside sources (e.g., reliable sources) to allow a monitor to be operational more quickly. The second approach can impose operational constraints, such as requiring networking capability, which may not be available in some scenarios where a monitor is used. A third approach to maintain integrity at an initial deployment can be using or designing a faster converging ephemeris monitor, which may not be viable with current technology and/or based on the motion of GPS satellites.

A fourth approach can use H1 ephemeris protection levels during initial start-up based on the N−1 position, which can ensure integrity and provide sufficient availability. In an example, the H1 protection level generated from an N−1 position can meet integrity requirements for a mobile system (MS) at start-up; meet performance requirements for the MS, such as startup time and precision approach availability; and enable fast startup for a high integrity differential GPS system.

For example, the H1 protection level generated from an N−1 position can provide high integrity for satellites (e.g., GPS satellites) with potential ephemeris faults without relying on the ephemeris monitor which can require too much "warm-up" time to meet a start-up requirement. With the H1 protection level generated from an N−1 position, system integrity can be available immediately with sufficient availability to meet MS requirements without requiring logistics for information to be available from an outside source at start-up. The H1 protection level generated from an N−1 position can provide autonomy from external sources for ephemeris information.

In another example, an aircraft can perform H1 calculation for ephemeris faults when flying against a MS that has just started (i.e., without an ephemeris history). The H1 calculation can protect against a rare single ranging source error. After a number of hours of mobile system (e.g., ground system) operations, an ephemeris monitor can detect a ephemeris error and the H1 calculation may no longer be needed.

In another configuration, the N−1 position solution can use an H1 hypothesis technique to calculate a protection level in view of a possible ephemeris error onboard an approaching aircraft. The H1 calculation can determine a relative solution by eliminating one satellite, which can be performed for all n satellites in view, and the monitor can compute the H1 protection level based on the integrity bound of each N−1 solution and a "bias" of the N−1 solution with an actual solution based on measurements using all the N satellites. The H1 protection level can operate off the assumption that abnormal ephemeris are rare. The integrity bound can take advantage of a rare probability of an abnormal ephemeris error. The final protection level can be the maximum of all H1 protection levels and an all satellite normal H0 protection level. The H1 protection level generated from an N−1 position can be used to facilitate a fast startup requirement and meet integrity and performance requirements for a precision approach.

Figure 2:
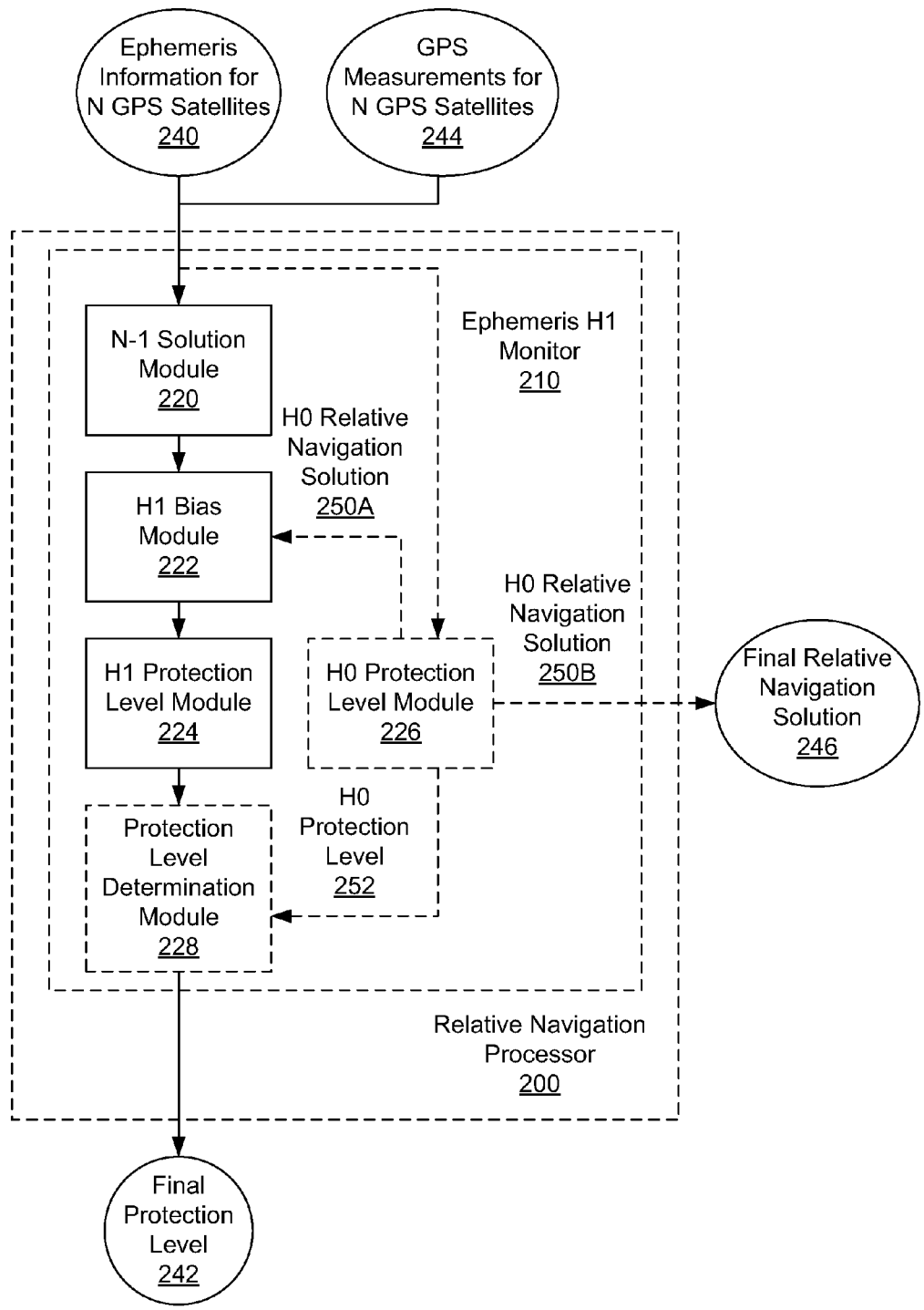
FIG. 2 illustrates a block diagram of an ephemeris H1 monitor in accordance with an example.

FIG. 2 illustrates a configuration of an H1 monitor (e.g., ephemeris monitor 210) which can perform a H1 hypothesis calculation based on an N−1 position. The ephemeris H1 monitor can be included in a relative navigation processor 200 of a high integrity relative navigation system or differential GPS augmentation system. The ephemeris H1 monitor can calculate a relative navigation solution between a reference location (such as a ship or land based runway) and a user (such as a fixed wing or rotary aircraft) using GPS measurements from a reference station at the reference location and the user. At least two GPS receivers may be used by the reference station for integrity, and at least one GPS receiver may be used by the user. The ephemeris H1 monitor, the relative navigation processor, the relative navigation system, and/or the differential GPS augmentation system can include a module 226 for calculating a fault free (H0) relative navigation solution (denoted by $P_o^{rel}$) and integrity protection levels (PL) for vertical, lateral and/or horizontal (denoted by $PL_o^{V/L/H}$). The ephemeris H1 monitor can implement a method to provide service that maintains integrity before a conventional ephemeris monitor warms up. A conventional ephemeris monitor can take several hours to warm up to ensure ephemeris integrity and validate ephemeris messages. The ephemeris H1 monitor can allow for a fast start up for a rapid deployment operation. The ephemeris H1 monitor can be used with a high integrity navigation system employing any differential GPS processing technique including but not limited to carrier-smoothed-code or real time kinematics (RTK). The ephemeris H1 monitor can build on the integrity the used for nominal high integrity operations in a relative navigation (RelNav) system.

In an example, a relative navigation processor can compute a relative position vector using available aircraft GPS measurements and matching reference receiver measurements or corrections, and corresponding error bounds. Equation 1 shows an example of a general formulation of the existing system position calculation.

$$P_o^{rel} = P_o^{rel}(\{R_{ref}^i\}_{i=1\ to\ N}, \{R_{user}^i\}_{i=1\ to\ N}, \{\sigma_{ref}^i\}_{i=1\ to\ N}, \{\sigma_{user}^i\}_{i=1\ to\ N}, \{\sigma_{env}^i\}_{i=1\ to\ N})$$ [Equation 1]

Where:

$\{Ref^i\}_{i=1\ to\ N}$ are the measurements or average corrections created from the reference receiver(s) to each of the N common satellites in view of the reference station and user. The index i can be a positive integer, where i indexes the measurement and/or correction by the relevant GPS satellite.

$\{R_{user}^i\}_{i=1\ to\ N}$ are the measurements of the user receiver(s) to each of the N common satellites in view.

$\{\sigma_{ref}^i\}_{i=1\ to\ N}$ are the error bounds for the reference measurements or corrections to each satellite i.

$\{\sigma_{user}^i\}_{i=1\ to\ N}$ are the error bounds for the user measurements to each satellite i.

$\{\sigma_{env}^i\}_{i=1\ to\ N}$ are the error bounds on the differential range measurements to each satellite i due to environmental effects.

The relative navigation processor via a H0 protection level module 226 can compute the protection level corresponding to a relative position vector using the measurement geometry, the error bounds, and the environmental error bounds (not shown for simplicity of the illustration). A reference receiver position $P_{ref}$ and a user receiver position $P_{user}$ along with GPS satellite positions can be used to calculate a geometry between positions. The calculation of $P_{ref}$ and $P_{user}$ may not be a circular computation or an iterative $P_e$ computation since approximate locations may sufficient for calculating the geometry. Allocated integrity risk can be used in the computation of $P_o^{rel}$ as well. In an example, the allocated integrity risk can be quite small (approximately $10^{-7}$). Protection levels can be computed for vertical, lateral and/or horizontal directions, denoted by V, L, and/or H, respectively. Equation 2 represents an example of a general formulation of an existing H0 protection level calculation. The exact form of the H0 protection level calculation can depend on the differential GPS processing technique employed.

$$PL_o^{V/L/H} = PL_o^{V/L/H}(P_{ref}, P_{user}, \{P_{GPS}^i\}_{i=1 \text{ to } N}, \{\sigma_{ref}^i\}_{i=1 \text{ to } N}, \{\sigma_{user}^i\}_{i=1 \text{ to } N}, \{\sigma_{env}^i\}_{i=1 \text{ to } N}, PIR_{H0}^{V/L/P}) \quad \text{[Equation 2]}$$

Where:

$P_{ref}$ is an approximate position of a reference point at a known relative position to the reference receiver(s).

$P_{user}$ is an approximate position of the user receiver, which can be used for linearization. The actual relative position can be determined using Equation 1.

$\{P_{GPS}^i\}_{i=1 \text{ to } N}$ are the positions of each of the N common satellites in view, indexed by i.

$\{\sigma_{ref}^i\}_{i=1 \text{ to } N}$ are the error bounds for the reference measurements or corrections to each satellite i.

$\{\sigma_{user}^i\}_{i=1 \text{ to } N}$ are the error bounds for the user measurements to each satellite i.

$\{\sigma_{env}^i\}_{i=1 \text{ to } N}$ are the error bounds on the differential range measurements to each satellite i due to environmental effects.

$PIR_{H0}^{V/L/H}$ is the integrity risk (or a probability of integrity risk) allocated for each fault free H0 protection level (vertical, lateral and/or horizontal). In an example, the probability that the position error exceeds the PL (in the V or L direction or the H plane) may be less than $PIR_{H0}^{V/L/H}$.

The H1 ephemeris monitor (or ephemeris H1 monitor 210) can use a similar formulation to the above formulation with some changes to compute the H1 ephemeris components.

An N−1 solution module 220 can compute the "N−1" solutions. The N−1 solution can include the N different position solutions of all but one of the N satellites used in the position computation. The index k can denote the "left out" satellite, where k can take on values from 1 to N. Equation 3 shows an example of how n position solutions can be computed by the function defined in Equation 1, where n is an integer between 1 and N. In an example, Equations 1 and 3 can include at least 4 satellites, so N>5.

$$P_{H1,k=1 \text{ to } N}^{rel} = P_o^{rel}(\{R_{ref}^{i \neq k}\}_{i=1 \text{ to } N}, \{R_{user}^{i \neq k}\}_{i=1 \text{ to } N}, \{\sigma_{ref}^{i \neq k}\}_{i=1 \text{ to } N}, \{\sigma_{user}^{i \neq k}\}_{i=1 \text{ to } N}, \{\sigma_{env}^{i \neq k}\}_{i=1 \text{ to } N}) \quad \text{[Equation 3]}$$

An H1 bias module 222 can compute the "N−1" biases, which can include N different biases for each type of protection level calculation (i.e., a vertical, lateral, and/or horizontal bias for each value of k). Equation 4 shows an example of how the H1 biases are calculated.

$$B_{k=1 \text{ to } N}^{V/L/H} = |P_{H1,k}^{rel} - P_o^{rel}|_{projected \text{ in vertical, lateral, or the horizontal plane}} \quad \text{[Equation 4]}$$

An H1 protection level module 224 can compute the "N−1" H1 protection levels (PL) for vertical V, lateral L, or horizontal H, which can include N different H1 PL's for each type (V, L, or H). A new integrity allocation for H1 (undetected fault) can generally be smaller than H0 integrity risks, so that the combined risks can satisfy the integrity requirement. However, the integrity allocation for H1 computation can also takes into account the probability that an undetected fault exists ($P_{apriori}$, which can be on the order of $10^{-4}$), which reduces H1 PLs and hence alleviates some performance concerns. Equation 5 shows an example of how H1 PLs are calculated based on the function defined in Equation 2.

$$PL_{H1,k=1 \text{ to } N}^{V/L/H} = \quad \text{[Equation 5]}$$
$$B_k^{V/L/H} + PL_o^{V/L/H}\left(P_{ref}, P_{user}, \{P_{GPS}^{j \neq k}\}_{i=1 \text{ to } N}, \{\sigma_{ref}^{j \neq k}\}_{i=1 \text{ to } N}, \{\sigma_{user}^{j \neq k}\}_{i=1 \text{ to } N}, \{\sigma_{env}^{j \neq k}\}_{i=1 \text{ to } N}, \frac{PIR_{H1}^{V/L/P}}{P_{apriori}}\right)$$

Where:

$PIR_{H1}^{V/L/H}$ is the integrity risk (or probability of integrity risk) allocated for an ephemeris fault (H1) protection level (vertical, lateral and/or horizontal). In an example, the probability allocation $PIR_{H1}^{V/L/H}$ can be an order of magnitude smaller than a fault free integrity risk allocation, but can be compensated by an apriori ephemeris fault probability.

$P_{apriori}$ is the probability that an undetected ephemeris fault exists based on an apriori fault rate bound. The apriori ephemeris fault probability can be approximately $10^{-4}$, which can indicate that ephemeris faults are rare.

A protection level determination module 228 can compute the overall PL for vertical V and lateral L directions and/or horizontal H plane, which can be a maximum of the individual PL's by type (V, L, and/or H)) as shown in the example of Equation 6.

$$PL^{V/L/H} = \underset{k=1 \text{ to } N}{\text{Max}}(PL_o^{V/L/H}, PL_{H1,k}^{V/L/H}) \quad \text{[Equation 6]}$$

The application of the H1 protection level generated from an N−1 position used to compensate for ephemeris faults allows a high integrity system to commence high integrity operations prior to being able to monitor ephemeris massages, which can allow for a rapid deployment. Because actual ephemeris faults can be quite rare the performance penalty from using N−1 satellites in the solution can be offset by the smaller integrity factors based on $$\frac{PIR_{H1}^{V/L/P}}{P_{apriori}}$$

(which can be orders of magnitude less stringent than $PIR_{H0}^{V/L/P}$), and the computed biases which can be negligible in a normal case when the ephemeris is not faulted. The H1 ephemeris monitor can support rapid deployment (e.g., a quick start) of a high integrity, high accuracy relative navigation system that can achieves useful performance requirements.

As previously described, FIG. 2 illustrates an example relative navigation processor 200, which can include an H1 monitor (e.g., an ephemeris H1 monitor 210). The H1 monitor can be configured to generate an H1 protection level from an N number of N−1 positions. The N−1 position can be derived by a differential global positioning system (GPS) satellite measurement removed from a plurality of N differential GPS satellites measurements. In an example, the H1 monitor can be configured as an ephemeris H1 monitor operable to provide integrity protection against a single source GPS ephemeris fault in differential GPS positioning by generating an H1 and final protection level from the N number of N−1 positions. Each differential GPS satellite measurement can include ephemeris information for a GPS satellite.

The H1 monitor can include an N−1 solution module 220, an H1 bias module 222, and an H1 protection level module 224. The N−1 solution module can be configured to calculate the N−1 position by removing one differential measurement from the differential global positioning system (GPS) satellite in the plurality of N GPS satellites from the differential measurements of the plurality of N GPS satellites. The H1 bias module can be configure to calculate a position bias between the N−1 positions and a N position, where in the N position uses the differential measurements of the plurality of N GPS satellites. The H1 protection level module can be configured to calculate an H1 protection level for each of the N−1 positions using the position bias, and select a largest H1 protection level from a group of H1 protection level representing the N−1 positions. The N position can be calculated from the differential measurements of at least five GPS satellites, and the N−1 position can be calculated from the differential measurements of at least four GPS satellites. In an example, the N−1 positions can use one less GPS satellite than the N position. The H1 protection level can represent an apriori probability of a single GPS ephemeris fault. In another example, the ephemeris H1 monitor can receive inputs of ephemeris information for N GPS satellites 240 and GPS measurements from a base receiver or a user receiver for N GPS satellites 244, and can generate an output of a final protection level 242.

In another configuration, the ephemeris H1 monitor 210 can also include an H0 protection level module 226 and a protection level determination module 228. The H0 protection level module configured to calculate an H0 protection level 252 from the N position, wherein the H0 protection level represents a fault free protection level. In another example, the H0 protection level module can provide a H0 relative navigation (RelNav) solution 205A-B which can provide feedback for a H1 bias module 222 or a final relative navigation solution 246. The protection level determination module configured to generate a final protection level by selecting the larger of the H0 protection level and the H1 protection level. The H1 protection level module can be further configured to calculate an H1 protection level from the position bias and a prior probability for a GPS ephemeris fault. In another example, the relative navigation processor 200 can be included in a differential global positioning system (DGPS) processor and/or a GPS receiver (not shown).

In another configuration, a system with a user global positioning system (GPS) receiver can generate a H1 protection level from an N−1 position. The user GPS receiver can be configured to receive ephemeris information from a plurality of N GPS satellites, and receive a position of at least one reference GPS receiver. The user GPS receiver can move independently of the at least one reference GPS receiver. The user GPS receiver can include a differential global positioning system (DGPS) processor configured to generate an H1 protection level from an N−1 position. The N−1 position can be derived from measurements from a plurality of N−1 GPS satellites, and N GPS satellites can be in view, and measurements from a GPS satellite in the plurality of N GPS satellites include ephemeris information for the GPS satellite. The plurality of N GPS satellites can include at least five GPS satellites, and the plurality of N−1 GPS satellites can include one less than the plurality of N GPS satellites and can include at least four GPS satellites. The user GPS receiver can be further configured to receive ephemeris information from the plurality of N GPS satellites received by the at least one reference GPS receiver.

The DGPS processor can be configured to: calculate N relative position vectors $P_{H1,k=1\ to\ N}^{rel}$ for the N−1 position representing each satellite k removed from the calculation; calculate N position biases $B_{k=1\ to\ N}^{V/L/H}$ for each value of k and in each vertical V, lateral L, and horizontal H plane; and calculate an H1 protection level $PL_{H1,k=1\ to\ N}^{V/L/H}$ for each value of k and in each vertical V, lateral L, and horizontal H plane. The $P_{H1,k=1\ to\ N}^{rel}$ for the N−1 position can be represented by $$P_{H1,k=1\ to\ N}^{rel} = P_o^{rel}(\{R_{ref}^{i \neq k}\}_{i=1\ to\ N}, \{R_{user}^{i \neq k}\}_{i=1\ to\ N}, \{\sigma_{user}^{i \neq k}\}_{i=1\ to\ N}, \{\sigma_{env}^{i \neq k}\}_{i=1\ to\ N}),$$

where $P_o^{rel}(\ )$ represents a fault free relative position vector function, $\{R_{ref}^{i \neq k}\}_{i=1\ to\ N}$ are measurements from a reference receiver to each of N common satellites in view except a satellite k, $\{R_{user}^{i \neq k}\}_{i=1\ to\ N}$ are measurements from user receiver to each of the N common satellites in view except the satellite k, $\{\sigma_{ref}^{i \neq k}\}_{i=1\ to\ N}$ are error bounds for reference measurements to each satellite i except the satellite k, $\{\sigma_{user}^{i \neq k}\}_{i=1\ to\ N}$ are error bounds for user measurements to each satellite i except the satellite k, and $\{\sigma_{env}^{i \neq k}\}_{i=1\ to\ N}$ are the error bounds on the differential range measurements to each satellite i except satellite k due to environmental effects. The $B_{k=1\ to\ N}^{V/L/H}$ for each value of k and in each vertical V, lateral L, and horizontal H plane can be represented by $B_{k=1\ to\ N}^{V/L/H} = |P_{H1,k}^{rel} - P_o^{rel}|_{projected\ in\ vertical,\ lateral,\ or\ the\ horizontal\ plane}$, where $P_o^{rel} = P_o^{rel}(\{R_{ref}^i\}_{i=1\ to\ N}, \{R_{user}^i\}_{i=1\ to\ N}, \{\sigma_{ref}^i\}_{i=1\ to\ N}, \{\sigma_{user}^i\}_{i=1\ to\ N}, \{\sigma_{env}^i\}_{i=1\ to\ N})$. The H1 protection level $PL_{H1,k=1\ to\ N}^{V/L/H}$ for each value of k and in each vertical V, lateral L, and horizontal H plane can be represented by $$PL_{H1,k=1\ to\ N}^{V/L/H} = B_k^{V/L/H} + PL_o^{V/L/H}\left(P_{ref}, P_{user}, \{P_{GPS}^{i \neq k}\}_{i=1\ to\ N}, \{\sigma_{ref}^{i \neq k}\}_{i=1\ to\ N}, \{\sigma_{user}^{i \neq k}\}_{i=1\ to\ N}, \{\sigma_{env}^{i \neq k}\}_{i=1\ to\ N}, \frac{PIR_{H1}^{V/L/P}}{P_{apriori}}\right),$$

where $P_{ref}$ is a position of a reference point at a known relative position to a reference receiver, $P_{user}$ is an approximate position of a user receiver, and $\{P_{GPS}^{i \neq k}\}_{i=1\ to\ N}$ are the positions of each of the N common satellites in view except satellite k, $PIR_{H1}^{V/L/H}$ is a probability of integrity risk allocated for an H1 ephemeris fault protection level, and $P_{apriori}$ is a probability that an undetected ephemeris fault exists based on an apriori fault rate bound.

In another example, the DGPS processor can be further configured to: calculate an H0 protection level $PL_o^{V/L/H}$ for the position using each of the N common satellites in view; and generate a final protection level $PL^{V/L/H}$. The H0 protection level $PL_o^{V/L/H}$ for the position using each of the N common satellites in view can be represented by $PL_o^{V/L/H} = PL_o^{V/L/H}(P_{ref}, P_{user}, \{P_{GPS}^i\}_{i=1\ to\ N}, \{\sigma_{ref}^i\}_{i=1\ to\ N}, \{\sigma_{user}^i\}_{i=1\ to\ N}, \{\sigma_{env}^i\}_{i=1\ to\ N}, PIR_{H0}^{V/L/P})$, where $\{P_{GPS}^i\}_{i=1\ to\ N}$ are the positions of each of the N common satellites in view indexed by i, $\{\sigma_{ref}^i\}_{i=1\ to\ N}$ are error bounds for reference measurements to each satellite i, $\{\sigma_{user}^i\}_{i=1\ to\ N}$ are error bounds for user measurements to each satellite i, and $\{\sigma_{env}^i\}_{i=1\ to\ N}$ are the error bounds on the differential range measurements to each satellite i due to environmental effects, and $PIR_{H0}^{V/L/H}$ is a probability of integrity risk allocated for each H0 fault free protection level in the vertical V, lateral L and horizontal H plane. The final protection level $PL^{V/L/H}$ can be represented by $$PL^{V/L/H} = \underset{k=1 \text{ to } N}{\text{Max}}(PL_o^{V/L/H}, PL_{H1,k}^{V/L/H}),$$

where Max( ) is a function that selects the largest value of the arguments.

Figure 3:
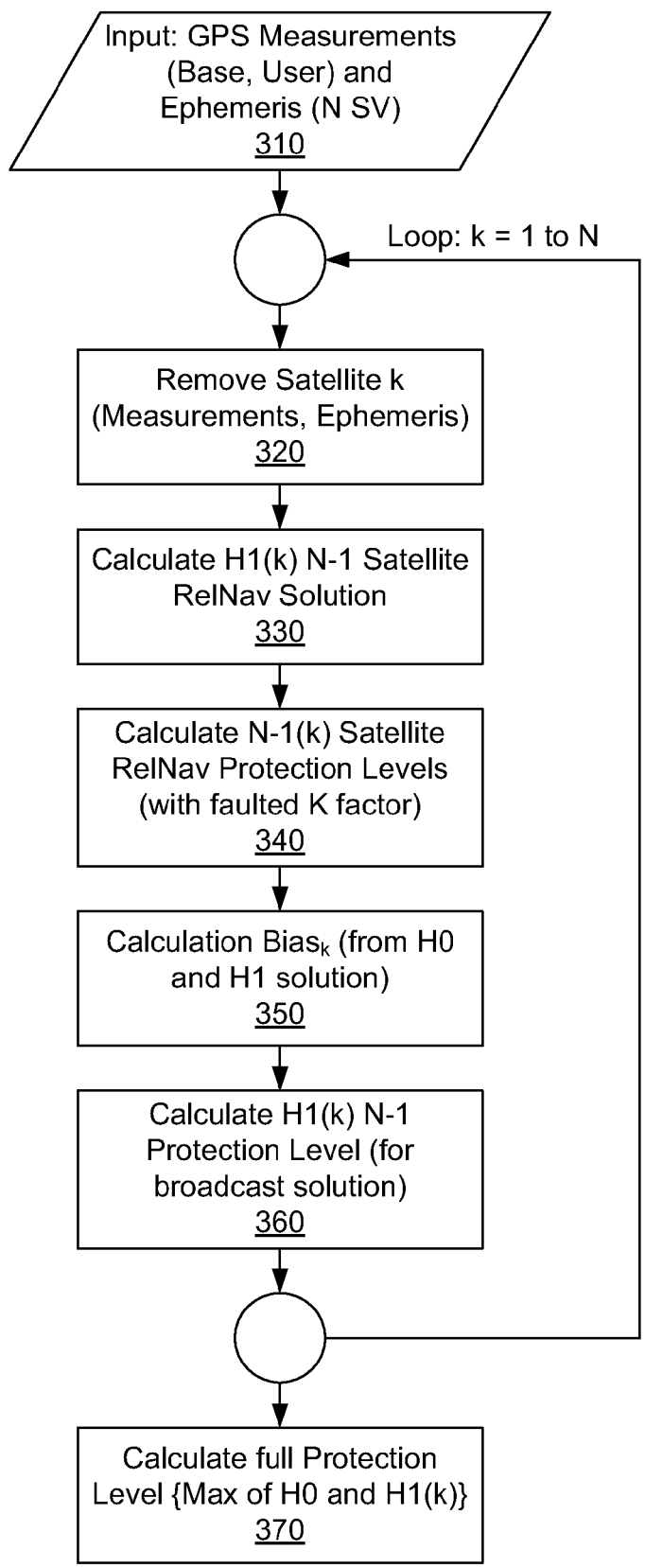
FIG. 3 illustrates a flow chart of a method for generating a H1 protection level from an N number of N−1 positions in accordance with an example.

FIG. 3 illustrates another example of method for generating a H1 protection level from an N number of N−1 positions. A relative navigation processor can receive an input that includes GPS measurements for a base receiver or user receiver and ephemeris (N space vehicles (SV)) 310. The relative navigation processor can remove measurements and ephemeris information for a satellite k 320 and calculate H1 N−1 satellite relative navigation (RelNav) solution with the inputs from satellite k removed 330. The relative navigation processor can calculate an N−1 satellite relative navigation (RelNav) protection levels (with faulted K factor) with the inputs from satellite k removed 340 and generate a calculation bias (from the H0 and H1 solution) with the inputs from satellite k removed 350. The relative navigation processor can calculate an N−1 satellite RelNav protection level (for a broadcast solution) 360. The relative navigation processor can repeat the process by incrementing k (where each N GPS satellite is represented by an integer k=1 to N) and remove measurements and ephemeris information for a next satellite k 320. After the H1 N−1 RelNav solution, calculation bias, and protection levels is calculated for each satellite k, the relative navigation processor can calculate a full protection level, which can be a maximum of a H0 protection level and each H1(k) protection level 370.

Figure 4:
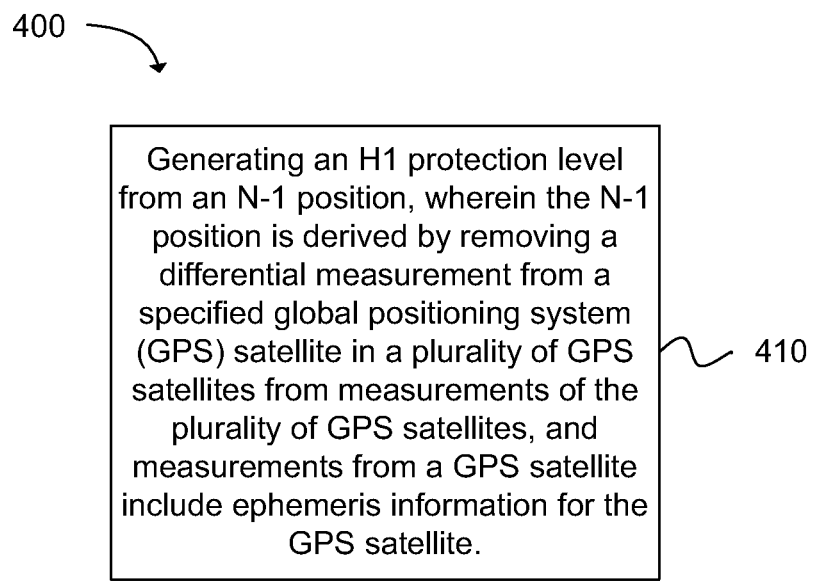
FIG. 4 depicts a flow chart of a method for generating a H1 protection level from an N−1 position in a global positioning system (GPS) receiver in accordance with an example.

Another example provides a method 400 for generating a H1 protection level from an N−1 position in a global positioning system (GPS) receiver, as shown in the flow chart in FIG. 4. The method may be executed as instructions on a machine, where the instructions are included on at least one computer readable medium. The method includes the operation of generating an H1 protection level from an N−1 position, wherein the N−1 position is derived by removing a differential measurement from a specified global positioning system (GPS) satellite in a plurality of GPS satellites from measurements of the plurality of GPS satellites, and measurements from a GPS satellite include ephemeris information for the GPS satellite, as in block 410.

The operation of generating an H1 protection level from an N−1 position can further include: calculating the N−1 position by removing a differential measurement from the specified global positioning system (GPS) satellite in a plurality of GPS satellites from the differential measurements of the plurality of GPS satellites; calculating a position bias between the N−1 position and a N position, where in the N position uses the differential measurements of the plurality of N GPS satellites; and calculating an H1 protection level by combining the position bias and the N−1 position protection level given apriori satellite fault.

The method can further include: calculating an H0 protection level from the N position; and generating a final protection level by selecting the larger of the H0 protection level and the H1 protection level. The H0 protection level can represent a fault free protection level. In an example, the N position can be calculated from the measurements of at least five GPS satellites, and the N−1 position can be calculated from the measurements of at least four GPS satellites.

In another configuration, the operation of generating an H1 protection level from an N−1 position can further include: calculating N relative position vectors $P_{H1,k=1 \text{ to } N}^{rel}$ for the N−1 position representing each satellite k removed from the calculation; calculating N position biases $B_{k=1 \text{ to } N}^{V/L/H}$ for each value of k and in each vertical V, lateral L, and horizontal H plane; and calculating an H1 protection level $PL_{H1,k=1 \text{ to } N}^{V/L/H}$ for each value of k and in each vertical V, lateral L, and horizontal H plane. The $P_{H1,k=1 \text{ to } N}^{rel}$ for the N−1 position; the $B_{k=1 \text{ to } N}^{V/L/H}$ for each value of k and in each vertical V, lateral L, and horizontal H plane; and the H1 protection level $PL_{H1,k=1 \text{ to } N}^{V/L/H}$ for each value of k and in each vertical V, lateral L, and horizontal H plane can be defined by equations shown above in relation to the system with the user GPS receiver that can generate a H1 protection level from an N−1 position.

In another example, the method can further include: calculating an H0 protection level $PL_o^{V/L/H}$ for the position using each of the N common satellites in view; and generating a final protection level $PL^{V/L/H}$. The H0 protection level $PL_o^{V/L/H}$ for the position using each of the N common satellites in view; and the final protection level $PL^{V/L/H}$ can be defined by equations shown above in relation to the system with the user GPS receiver that can generate a H1 protection level from an N−1 position.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The positioning systems, GPS receivers, and/or monitors may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A relative navigation processor, comprising:
an H1 monitor configured to generate an H1 protection level from an N number of N−1 positions, wherein an N−1 position is derived by a differential global positioning system (GPS) satellite measurement removed from a plurality of N differential GPS satellites measurements, wherein the H1 monitor is configured as an ephemeris H1 monitor operable to provide integrity protection against a single source GPS ephemeris fault in differential GPS positioning by generating an H1 and final protection level from the N number of N−1 positions, wherein each differential GPS satellite measurement includes ephemeris information for a GPS satellite.

2. The relative navigation processor of claim 1, wherein the H1 monitor further comprises:
an N−1 solution module configured to calculate the N−1 position by removing one differential measurement from the differential global positioning system (GPS) satellite in the plurality of N GPS satellites from the differential measurements of the plurality of N GPS satellites;
an H1 bias module configure to calculate a position bias between the N−1 positions and a N position, where in the N position uses the differential measurements of the plurality of N GPS satellites; and
an H1 protection level module configured to calculate an H1 protection level for each of the N−1 positions using the position bias, and select a largest H1 protection level from a group of H1 protection level representing the N−1 positions.

3. The relative navigation processor of claim 2, wherein the H1 monitor further comprises:
an H0 protection level module configured to calculate an H0 protection level from the N position, wherein the H0 protection level represents a fault free protection level; and
a protection level determination module configured to generate a final protection level by selecting the larger of the H0 protection level and the H1 protection level.

4. The relative navigation processor of claim 2, wherein the H1 protection level module is further configured to calculate an H1 protection level from the position bias and a prior probability for a GPS ephemeris fault.

5. The relative navigation processor of claim 2, wherein the N position is calculated from the differential measurements of at least five GPS satellites, the N−1 position is calculated from the differential measurements of at least four GPS satellites, and the N−1 positions use one less GPS satellite than the N position.

6. The relative navigation processor of claim 1, wherein H1 protection level represents an a priori probability of a single GPS ephemeris fault.

7. The relative navigation processor of claim 1, wherein a differential global positioning system (DGPS) processor includes the relative navigation processor.

8. The relative navigation processor of claim 1, wherein a GPS receiver includes the relative navigation processor.

9. A method for generating a H1 protection level from an N−1 position in a global positioning system (GPS) receiver, comprising:
under control of one or more computer systems configured with executable instructions:
generating an H1 protection level from an N−1 position, wherein the N−1 position is derived by removing a differential measurement from a specified global positioning system (GPS) satellite in a plurality of GPS satellites from differential measurements of the plurality of GPS satellites, and differential measurements from a GPS satellite include ephemeris information for the GPS satellite.

10. The method of claim 9, wherein generating an H1 protection level from an N−1 position further comprises:

calculating the N−1 position by removing a differential measurement from the specified global positioning system (GPS) satellite in a plurality of GPS satellites from the differential measurements of the plurality of GPS satellites;

calculating a position bias between the N−1 position and a N position, where in the N position uses the differential measurements of the plurality of N GPS satellites; and calculating an H1 protection level by combining the position bias and the N−1 position protection level given a priori satellite fault.

11. The method of claim 10, further comprising:
calculating an H0 protection level from the N position, wherein the H0 protection level represents a fault free protection level; and generating a final protection level by selecting the larger of the H0 protection level and the H1 protection level.

12. The method of claim 10, wherein the N position is calculated from the differential measurements of at least five GPS satellites, and the N−1 position is calculated from the differential measurements of at least four GPS satellites.

13. The method of claim 9, wherein generating an H1 protection level from an N−1 position further comprises:

calculating N relative position vectors $P_{H1,k=1 \text{ to } N}^{rel}$ for the N−1 position representing each satellite k removed from the calculation, where $$P_{H1,k=1 \text{ to } N}^{rel} = P_o^{rel}(\{R_{ref}^{i \neq k}\}_{i=1 \text{ to } N}, \{R_{user}^{i \neq k}\}_{i=1 \text{ to } N}, \{\sigma_{ref}^{i \neq k}\}_{i=1 \text{ to } N}, \{\sigma_{user}^{i \neq k}\}_{i=1 \text{ to } N}, \{\sigma_{env}^{i \neq k}\}_{i=1 \text{ to } N}),$$

$P_o^{rel}$ represents a fault free relative position vector function, $\{R_{ref}^{i \neq k}\}_{i=1 \text{ to } N}$ are measurements from a reference receiver to each of N common satellites in view except a satellite k, $\{R_{user}^{i \neq k}\}_{i=1 \text{ to } N}$ are measurements from user receiver to each of the N common satellites in view except the satellite k, $\{\sigma_{ref}^{i \neq k}\}_{i=1 \text{ to } N}$ are error bounds for reference measurements to each satellite i except the satellite k, $\{\sigma_{user}^{i \neq k}\}_{i=1 \text{ to } N}$ are error bounds for user measurements to each satellite i except the satellite k, and $\{\sigma_{env}^{i \neq k}\}_{i=1 \text{ to } N}$ are the error bounds on the differential range measurements to each satellite i except satellite k due to environmental effects;

calculating N position biases $B_{k=1 \text{ to } N}^{V/L/H} = |P_{H1,k}^{rel} - P_o^{rel}|_{projected \text{ in vertical, lateral, or the horizontal plane}}$ for each value of k and in each vertical V, lateral L, and horizontal H plane, where $$P_o^{rel} = P_o^{rel}(\{R_{ref}^i\}_{i=1 \text{ to } N}, \{R_{user}^i\}_{i=1 \text{ to } N}, \{\sigma_{ref}^i\}_{i=1 \text{ to } N}, \{\sigma_{user}^i\}_{i=1 \text{ to } N}, \{\sigma_{env}^i\}_{i=1 \text{ to } N}); \text{ and}$$

calculating an H1 protection level $PL_{H1,K=1 \text{ to } N}^{V/L/H}$ for each value of k and in each vertical V, lateral L, and horizontal H plane, where $$PL_{H1,k=1 \text{ to } N}^{V/L/H} = B_k^{V/L/H} + PL_o^{V/L/H}\left(P_{ref}, P_{user}, \{P_{GPS}^{j \neq k}\}_{i=1 \text{ to } N}, \{\sigma_{ref}^{j \neq k}\}_{i=1 \text{ to } N}, \{\sigma_{user}^{j \neq k}\}_{i=1 \text{ to } N}, \{\sigma_{env}^{j \neq k}\}_{i=1 \text{ to } N}, \frac{PIR_{H1}^{V/L/P}}{P_{apriori}}\right),$$

$P_{ref}$ is a position of a reference point at a known relative position to a reference receiver, $P_{user}$ is an approximate position of a user receiver, and $\{P_{GPS}^{i \neq k}\}_{i=1 \text{ to } N}$ are the positions of each of the N common satellites in view except satellite k, $PIR_{H1}^{V/L/H}$ is a probability of integrity risk allocated for an H1 ephemeris fault protection level, and $P_{apriori}$ is a probability that an undetected ephemeris fault exists based on an apriori fault rate bound.

14. The method of claim 12, further comprising:
calculating an H0 protection level $PL_o^{V/L/H}$ for the position using each of the N common satellites in view, where $$PL_o^{V/L/H} = PL_o^{V/L/H}(P_{ref}, P_{user}, \{P_{GPS}^i\}_{i=1 \text{ to } N}, \{\sigma_{ref}^i\}_{i=1 \text{ to } N}, \{\sigma_{user}^i\}_{i=1 \text{ to } N}, \{\sigma_{env}^i\}_{i=1 \text{ to } N}, PIR_{H0}^{V/L/P}),$$

$\{P_{GPS}^i\}_{i=1 \text{ to } N}$ are the positions of each of the N common satellites in view indexed by i, $\{\sigma_{ref}^i\}_{i=1 \text{ to } N}$ are error bounds for reference measurements to each satellite i, $\{\sigma_{user}^i\}_{i=1 \text{ to } N}$ are error bounds for user measurements to each satellite i, and $\{\sigma_{env}^i\}_{i=1 \text{ to } N}$ are the error bounds on the differential range measurements to each satellite i due to environmental effects, and $PIR_{H0}^{V/L/H}$ is a probability of integrity risk allocated for each H0 fault free protection level in the vertical V, lateral L and horizontal H plane; and generating a final protection level $$PL^{V/L/H} = \underset{k=1 \text{ to } N}{\text{Max}}(PL_o^{V/L/H}, PL_{H1,k}^{V/L/H}),$$

where Max( ) is a function that selects the largest value of the arguments.

15. A computer program product, comprising a non-transitory computer readable storage medium having a computer readable program code embodied therein, the computer readable program code adapted to be executed to implement the method of claim 10.

16. A system for generating a H1 protection level from an N−1 position, comprising:

an user global positioning system (GPS) receiver configured to receive ephemeris information from a plurality of N GPS satellites, and receive a position of at least one reference GPS receiver, wherein the user GPS receiver moves independently of the at least one reference GPS receiver; and a differential global positioning system (DGPS) processor within the user GPS receiver, the processor storing instructions that, when executed by the processor, cause the processor to generate an H1 protection level from an N−1 position, wherein the N−1 position is derived from differential measurements from a plurality of N−1 GPS satellites, and N GPS satellites are in view, and differential measurements from a GPS satellite in the plurality of N GPS satellites include ephemeris information for the GPS satellite.

17. The system of claim 16, wherein the DGPS processor is further configured to:

calculate N relative position vectors $P_{H1,k=1 \text{ to } N}^{rel}$ for the N−1 position representing each satellite k removed from the calculation, where $$P_{H1,k=1 \text{ to } N}^{rel} = P_o^{rel}(\{R_{ref}^{i \neq k}\}_{i=1 \text{ to } N}, \{R_{user}^{i \neq k}\}_{i=1 \text{ to } N}, \{\sigma_{ref}^{i \neq k}\}_{i=1 \text{ to } N}, \{\sigma_{user}^{i \neq k}\}_{i=1 \text{ to } N}, \{\sigma_{env}^{i \neq k}\}_{i=1 \text{ to } N}),$$

$P_o^{rel}(\ )$ represents a fault free relative position vector function, $\{R_{ref}^{i \neq k}\}_{i=1 \text{ to } N}$ are measurements from a reference receiver to each of N common satellites in view except a satellite k, $\{R_{user}^{i \neq k}\}_{i=1 \text{ to } N}$ are measurements from user receiver to each of the N common satellites in view except the satellite k, $\{\sigma_{ref}^{i \neq k}\}_{i=1 \text{ to } N}$ are error bounds for reference measurements to each satellite i except the satellite k, $\{\sigma_{user}^{i \neq k}\}_{i=1 \text{ to } N}$ are error bounds for user measurements to each satellite i except the satellite k, and $\{\sigma_{env}^{i \neq k}\}_{i=1 \text{ to } N}$ are the error bounds on the differential range measurements to each satellite i except satellite k due to environmental effects;

calculate N position biases $$B_{k=1 \text{ to } N}^{V/L/H} = |P_{H1,k}^{rel} - P_o^{rel}|_{\text{projected in vertical, lateral, or the horizontal plane}}$$

for each value of k and in each vertical V, lateral L, and horizontal H plane, where $$P_o^{rel} = P_o^{rel}(\{R_{ref}^i\}_{i=1 \text{ to } N}, \{R_{user}^i\}_{i=1 \text{ to } N}, \{\sigma_{ref}^i\}_{i=1 \text{ to } N}, \{\sigma_{user}^i\}_{i=1 \text{ to } N}, \{\sigma_{env}^i\}_{i=1 \text{ to } N}); \text{ and}$$

calculate an H1 protection level $PL_{H1,k=1 \text{ to } N}^{V/L/H}$ for each value of k and in each vertical V, lateral L, and horizontal H plane, where $$PL_{H1,k=1 \text{ to } N}^{V/L/H} = B_k^{V/L/H} + PL_o^{V/L/H}\left(P_{ref}, P_{user}, \{P_{GPS}^{j \neq k}\}_{i=1 \text{ to } N}, \right.$$
$$\left. \{\sigma_{ref}^{j \neq k}\}_{i=1 \text{ to } N}, \{\sigma_{user}^{j \neq k}\}_{i=1 \text{ to } N}, \{\sigma_{env}^{j \neq k}\}_{i=1 \text{ to } N}, \frac{PIR_{H1}^{V/L/P}}{P_{apriori}}\right),$$

$P_{ref}$ is a position of a reference point at a known relative position to a reference receiver, $P_{user}$ is approximate position of a user receiver, user and $$\{P_{GPS}^{j \neq k}\}_{i=1 \text{ to } N}$$

are the positions of each of the N common satellites in view except satellite k, $PIR_{H1}^{V/L/H}$ is a probability of integrity risk allocated for an H1 ephemeris fault protection level, and $P_{apriori}$ is a probability that an undetected ephemeris fault exists based on an apriori fault rate bound.

18. The system of claim 17, wherein the DGPS processor is further configured to:

calculate an H0 protection level $PL_o^{V/L/H}$ for the position using each of the N common satellites in view, where $$PL_o^{V/L/H} = PL_o^{V/L/H}(P_{ref}, P_{user}, \{P_{GPS}^i\}_{i=1 \text{ to } N}, \{\sigma_{ref}^i\}_{i=1 \text{ to } N}, \{\sigma_{user}^i\}_{i=1 \text{ to } N}, \{\sigma_{env}^i\}_{i=1 \text{ to } N}, PIR_{H0}^{V/L/P}),$$

$\{P_{GPS}^i\}_{i=1 \text{ to } N}$ are the positions of each of the N common satellites in view indexed by i, $\{\sigma_{ref}^i\}_{i=1 \text{ to } N}$ are error bounds for reference measurements to each satellite i, $\{\sigma_{user}^i\}_{i=1 \text{ to } N}$ are error bounds for user measurements to each satellite i, and $\{\sigma_{env}^i\}_{i=1 \text{ to } N}$ are the error bounds on the differential range measurements to each satellite i due to environmental effects, and $PIR_{H0}^{V/L/H}$ is a probability of integrity risk allocated for each H0 fault free protection level in the vertical V, lateral L and horizontal H plane; and generate a final protection level $$PL^{V/L/H} = \underset{k=1 \text{ to } N}{\text{Max}}(PL_o^{V/L/H}, PL_{H1,k}^{V/L/H}),$$

where Max( ) is a function that selects the largest value of the arguments.

19. The system of claim 16, wherein the plurality of N GPS satellites includes at least five GPS satellites, and the plurality of N−1 GPS satellites is one less than the plurality of N GPS satellites and includes at least four GPS satellites.

20. The system of claim 16, wherein the user GPS receiver is further configured to receive ephemeris information from the plurality of N GPS satellites received by the at least one reference GPS receiver.

\* \* \* \* \*